(12) United States Patent
Takada et al.

(10) Patent No.: US 8,141,232 B2
(45) Date of Patent: Mar. 27, 2012

(54) METHOD OF MANUFACTURING STATOR FOR DYNAMOELECTRIC MACHINE

(75) Inventors: Masahiro Takada, Okazaki (JP); Atsuo Ishizuka, Nagoya (JP)

(73) Assignee: Denso Corporation, Kariya (JP)

( * ) Notice: Subject to any disclaimer, the term of this patent is extended or adjusted under 35 U.S.C. 154(b) by 429 days.

(21) Appl. No.: 12/560,591

(22) Filed: Sep. 16, 2009

(65) Prior Publication Data

US 2010/0064505 A1     Mar. 18, 2010

(30) Foreign Application Priority Data

Sep. 16, 2008 (JP) ................................. 2008-236941
Jul. 1, 2009 (JP) ................................. 2009-156936

(51) Int. Cl.
*H02K 15/00* (2006.01)
(52) U.S. Cl. .......................................... 29/596; 29/606
(58) Field of Classification Search .............. 29/596, 29/606, 732, 733, 736; 140/71 C, 92.1, 92.2; 310/179, 260

See application file for complete search history.

(56) References Cited

U.S. PATENT DOCUMENTS

| | | | |
|---|---|---|---|
| 5,659,219 A * | 8/1997 | Momose et al. | 310/260 |
| 7,337,525 B2 * | 3/2008 | Ueda et al. | 29/596 |
| 2004/0207282 A1 | 10/2004 | Ueda et al. | |
| 2007/0180682 A1 | 8/2007 | Ueda et al. | |

FOREIGN PATENT DOCUMENTS

| | | |
|---|---|---|
| JP | 2002-051485 | 2/2002 |
| JP | 3982446 | 11/2004 |

* cited by examiner

*Primary Examiner* — Thiem Phan
(74) *Attorney, Agent, or Firm* — Nixon & Vanderhye PC

(57) ABSTRACT

There is disclosed a method of manufacturing a stator for a dynamoelectric machine. The method includes a step of mounting a hollow cylindrical electric wire assembly, which includes a plurality of straight stacked portions of shaped electric wires, to a hollow cylindrical stator core that includes a plurality of slots formed in the radially inner surface thereof. The mounting step includes: (1) placing the electric wire assembly radially inside of the stator core so that each of the straight stacked portions of the electric wire assembly is radially aligned with a corresponding one of the slots of the stator core; and (2) radially expanding the electric wire assembly to insert the straight stacked portions of the electric wire assembly into the corresponding slots of the stator core.

8 Claims, 14 Drawing Sheets

METHOD OF MANUFACTURING STATOR FOR DYNAMOELECTRIC MACHINE

CROSS-REFERENCE TO RELATED APPLICATIONS

This application is based on and claims priority from Japanese Patent Applications No. 2008-236941, filed on Sep. 16, 2008, and No. 2009-156936, filed on Jul. 1, 2009, the contents of which are hereby incorporated by reference into this application.

BACKGROUND OF THE INVENTION

1. Technical Field of the Invention

The present invention relates generally to methods of manufacturing stators for dynamoelectric machines. More particularly, the invention relates to a method of manufacturing a stator for a dynamoelectric machine, which is characterized by a process of mounting a stator coil to a stator core that has a unitary structure.

2. Description of the Related Art

In recent years, dynamoelectric machines, such as electric motors and electric generators, have been required to be compact, be able to output high power, and have high quality.

In particular, for dynamoelectric machines for use in motor vehicles, the spaces available for installation of those machines in the motor vehicles have been decreasing, while the needs for them to output high power have been increasing.

Japanese Patent First Publication No. 2002-51485 discloses a stator for a dynamoelectric machine. The stator includes a stator core that is composed of a plurality of stator core pieces each having a coil wound thereon. The stator further includes a case for receiving the stator core pieces, which is composed of a pair of cylindrical inner and outer cases. The inner case temporarily holds the stator core pieces that are disposed in an annular form on the radially inner surface of the inner case. The outer case is shrinkage-fitted on the radially outer surface of the inner case, thereby fixing the stator core pieces in the inner case.

Japanese Patent No. 3982446, an English equivalent of which is US 2007/0180682 A1, discloses a method of manufacturing a stator for an electric rotating machine (or a dynamoelectric machine). According to the method, a stator winding set is formed to have a hollow cylindrical shape, disposed radially inside of a hollow cylindrical stator core, and expanded and inserted into slots formed in the radially inner surface of the stator core.

Moreover, there has been known a method of manufacturing a stator coil. According to the method, a plurality of shaped electric wires are first obtained by shaping a plurality of straight electric wires. Each of the shaped electric wires is so shaped as to include a plurality of straight portions parallel to each other and a plurality of connecting portions connecting the straight portions. The shaped electric wires are assembled together to make up a flat electric wire assembly.

In the flat electric wire assembly, a plurality of shaped electric wire pairs, each of which consists of two shaped electric wires, are arranged to extend in the longitudinal direction of the assembly in parallel with each other. Further, each of the shaped electric wire pairs includes a plurality of straight overlapped portions that are formed by overlapping the straight portions of one of the two shaped electric wires of the pair respectively with those of the other. The straight overlapped portions each extend perpendicular to the longitudinal direction of the flat electric wire assembly and are spaced in the longitudinal direction at predetermined intervals.

The flat electric wire assembly is further rolled around a cylindrical core member by a predetermined number of turns, thereby forming a hollow cylindrical electric wire assembly. The hollow cylindrical electric wire assembly includes a plurality of straight stacked portions, in each of which a predetermined number of the straight overlapped portions of the flat electric wire assembly are stacked together in the radial direction of the assembly. The straight stacked portions each extend parallel to the axial direction of the hollow cylindrical electric wire assembly, and are spaced at predetermined intervals in the circumferential direction of the same.

The hollow cylindrical electric wire assembly can make up a stator coil of a stator only after being mounted to a stator core such that: each of the straight stacked portions of the assembly is fitted in one of a plurality of slots of the stator core; and all of the connecting portions of the shaped electric wire pairs of the assembly are located outside the slots of the stator core.

However, when the stator core has a unitary (or one-piece) structure, it is very difficult to mount the hollow cylindrical electric wire assembly to the stator core.

To solve this problem, one may consider employing the divided stator core structure as disclosed in Japanese Patent First Publication No. 2002-51485. More specifically, the stator core might be composed of a plurality of stator core pieces. Further, the stator core pieces might be separately fitted onto the hollow cylindrical electric wire assembly from the radially outer side. Then, a hollow cylindrical case might be fitted onto the radially outer surface of the stator core, thereby holding the stator core pieces along with the hollow cylindrical electric wire assembly (i.e., the stator coil).

However, with the divided stator core structure, it would be difficult to realize a suitable magnetic circuit of the stator.

Therefore, there is a strong demand for a manufacturing method by which the hollow cylindrical electric wire assembly can be easily mounted to the stator core which has a unitary structure.

Moreover, according to the method disclosed in Japanese Patent No. 3982446, the stator winding set is inserted into the slots of the stator core only by pressing the coil end parts of the stator winding set. Therefore, it is necessary to apply large compression forces to the coil end parts. However, this will cause the coil end parts to be greatly deformed, thereby increasing the air gaps between the shaped electric wires making up the stator winding set. Moreover, to allow application of large pressing forces to the coil end parts, it is necessary to set large axial heights of the coil end parts. However, with the large axial heights of the coil end parts, the axial dimension of the stator will be increased and the performance of the stator will be lowered. In addition, the stator winding set disclosed in Japanese Patent No. 3982446 is different in structure from the hollow cylindrical electric wire assembly described above.

SUMMARY OF THE INVENTION

According to the present invention, there is provided a method of manufacturing a stator for a dynamoelectric machine. The method includes the following steps: (a) preparing a plurality of electric wires and a stator core, wherein the stator core has a hollow cylindrical shape and includes a plurality of slots formed in a radially inner surface thereof; (b) shaping the electric wires to obtain a plurality of shaped electric wires, wherein each of the shaped electric wires includes a plurality of straight portions, which are parallel to each other, and a plurality of connecting portions each of which connects an adjacent pair of the straight portions; (c) assembling the shaped electric wires to form a flat electric wire assembly, wherein the flat electric wire assembly includes a plurality of straight overlapped portions each of which is formed by overlapping a predetermined number of the straight portions of the shaped electric wires; (d) rolling the flat electric wire assembly by a predetermined number of turns to form a hollow cylindrical electric wire assembly, wherein the hollow cylindrical electric wire assembly has an outer diameter smaller than the inner diameter of the stator core and includes a plurality of straight stacked portions each of which is formed by radially stacking a predetermined number of the straight overlapped portions of the flat electric wire assembly; and (e) mounting the hollow cylindrical electric wire assembly to the stator core to form the stator which includes the stator core and a multi-phase stator coil made up of the hollow cylindrical electric wire assembly. Further, the mounting step includes: (e1) placing the hollow cylindrical electric wire assembly radially inside of the stator core so that each of the straight stacked portions of the hollow cylindrical electric wire assembly is radially aligned with a corresponding one of the slots of the stator core; and (e2) radially expanding the hollow cylindrical electric wire assembly to insert the straight stacked portions of the hollow cylindrical electric wire assembly into the corresponding slots of the stator core.

With the above method, it is possible to mount the hollow cylindrical electric wire assembly to the stator core which has a unitary (or one-piece) structure. Consequently, compared to the case of employing the divided stator core structure as disclosed in Japanese Patent First Publication No. 2002-51485, it is possible to realize a more suitable magnetic circuit of the stator, thereby improving the performance of the dynamoelectric machine. Moreover, it is unnecessary to shrinkage-fit a hollow cylindrical case onto the radially outer surface of the stator core as in the case of employing the divided stator core structure. Furthermore, with the above method, it is possible to minimize the air gaps between the shaped electric wires in the assembling and rolling steps. Consequently, the size of the stator coil (i.e., the hollow cylindrical electric wire assembly) can be minimized, and the performance of the stator coil can be improved.

According to further implementations of the invention, in the mounting step, the hollow cylindrical electric wire assembly is radially expanded by pressing it radially outward over its entire axial length.

In the mounting step, with the radial expansion of the hollow cylindrical electric wire assembly, the circumferential spaces between adjacent pairs of the straight stacked portions are increased and the axial heights of the connecting portions are decreased.

Further, each of the connecting portions has an apex, which is centrally located between and furthest from the pair of the straight portions connected by the connecting portion, and a pair of intersections at which the connecting portion intersects with the pair of the straight portions. Each of the connecting portions is stepped between the apex and each of the intersections. In the mounting step, the axial height of each of the connecting portions is decreased with deformation of the connecting portion only at the apex and the intersections.

In the mounting step, the hollow cylindrical electric wire assembly is radially expanded using an expanding jig. The expanding jig includes a small-diameter end having a diameter smaller than the inner diameter of the hollow cylindrical electric wire assembly, a large-diameter portion having a diameter substantially equal to the inner diameter of the stator core, and a taper portion that tapers from the large-diameter portion to the small-diameter end. In radially expanding the hollow cylindrical electric wire assembly, the expanding jig is inserted, from the small-diameter end, into the radially inside of the assembly, until the large-diameter portion comes to occupy the entire axial length of the assembly.

The expanding jig further includes a plurality of rollers that are provided on the radially outer periphery of the large-diameter portion and configured to be rollable in the axial direction of the expanding jig.

Further, the rollers are provided at the boundary between the large-diameter portion and the taper portion. The number of the rollers is equal to the number of the slots of the stator core. In the mounting step, the expanding jig is positioned in the circumferential direction of the stator core so that each of the rollers is radially aligned with a corresponding one of the slots of the stator core.

L2 is substantially equal to (D2×L1)/D1, where D2 represents the outer diameter of the hollow cylindrical electric wire assembly before the mounting step, L2 represents the pitch between the straight portions in each of the shaped electric wires included in the hollow cylindrical electric wire assembly before the mounting step, D1 represents the outer diameter of the hollow cylindrical electric wire assembly after the mounting step, and L1 represents the pitch between the straight portions in each of the shaped electric wires included in the hollow cylindrical electric wire assembly after the mounting step.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

DESCRIPTION OF PREFERRED EMBODIMENTS

Figure 1:
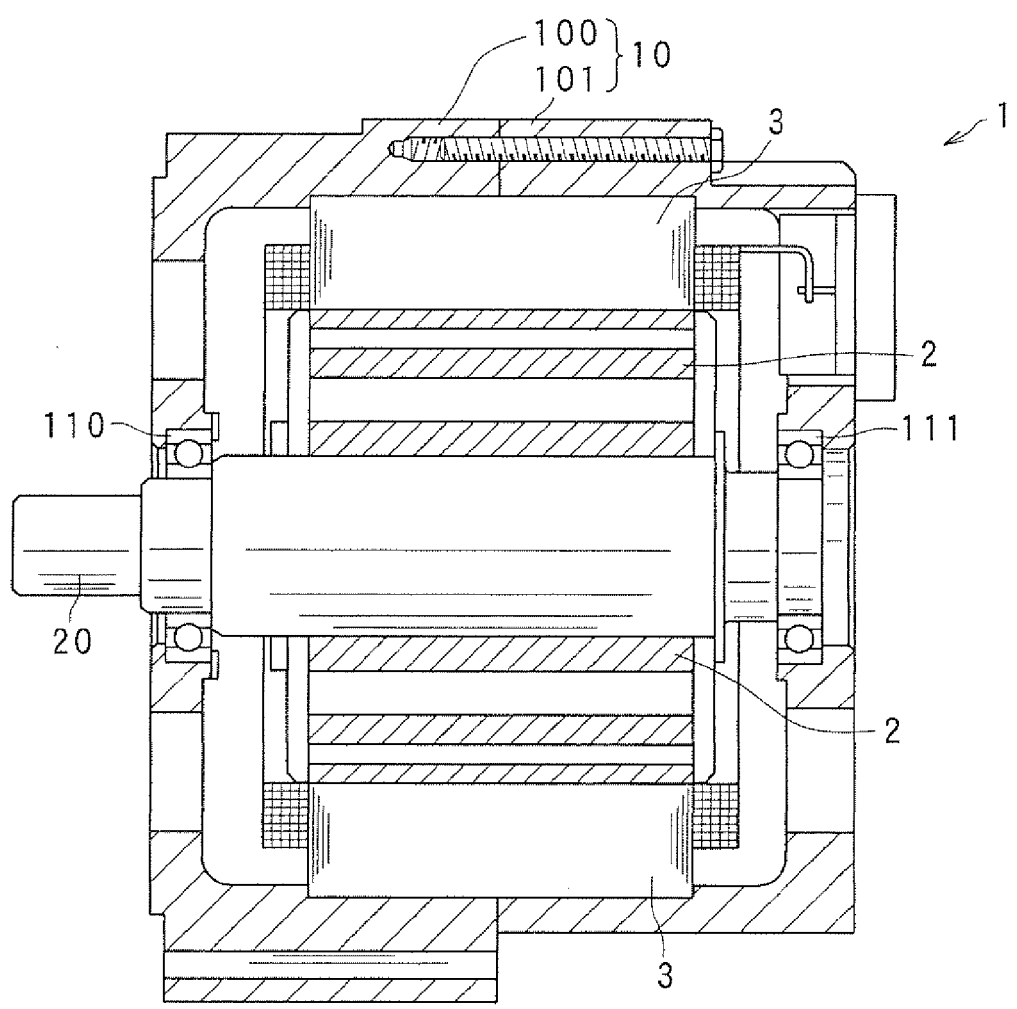
FIG. 1 is a schematic cross-sectional view showing the overall configuration of a dynamoelectric machine which includes a stator manufactured by a method according to the first embodiment of the invention.

Preferred embodiments of the present invention will be described hereinafter with reference to FIGS. 1-14. It should be noted that, for the sake of clarity and understanding, identical components having identical functions in different embodiments of the invention have been marked, where possible, with the same reference numerals in each of the figures.

First Embodiment

FIG. 1 shows the overall configuration of a dynamoelectric machine 1 which includes a stator 3 manufactured by a method according to the present embodiment.

The dynamoelectric machine 1 is configured to function as either an electric generator or an electric motor in a motor vehicle, such as an electric vehicle or a hybrid vehicle.

As shown in FIG. 1, the dynamoelectric machine 1 includes a housing 10 and a rotor 2 in addition to the stator 3. The housing 10 is composed of a pair of cup-shaped housing pieces 100 and 101 which are jointed together at the open ends thereof. The housing 10 has a pair of bearings 110 and 111 mounted therein, via which a rotating shaft 20 is rotatably supported by the housing 10. The rotor 2 is received in the housing 10 and fixed on the rotating shaft 20. The stator 3 is fixed in the housing 10 so as to surround the radially outer periphery of the rotor 2.

The rotor 2 includes a permanent magnet that is provided on a radially outer periphery of the rotor 2 facing a radially inner periphery of the stator 3. The permanent magnet has formed therein a plurality of magnetic poles that are arranged in the circumferential direction of the rotating shaft 20 at predetermined intervals. The magnetic poles are so magnetized that the polarities of the magnetic poles alternately change between N (North) and S (South) in the circumferential direction of the rotating shaft 20. The number of the magnetic poles is dependent on the type of the dynamoelectric machine 1. In the present embodiment, the number of the magnetic poles is equal to eight (i.e., four N poles and four S poles).

Figure 2:
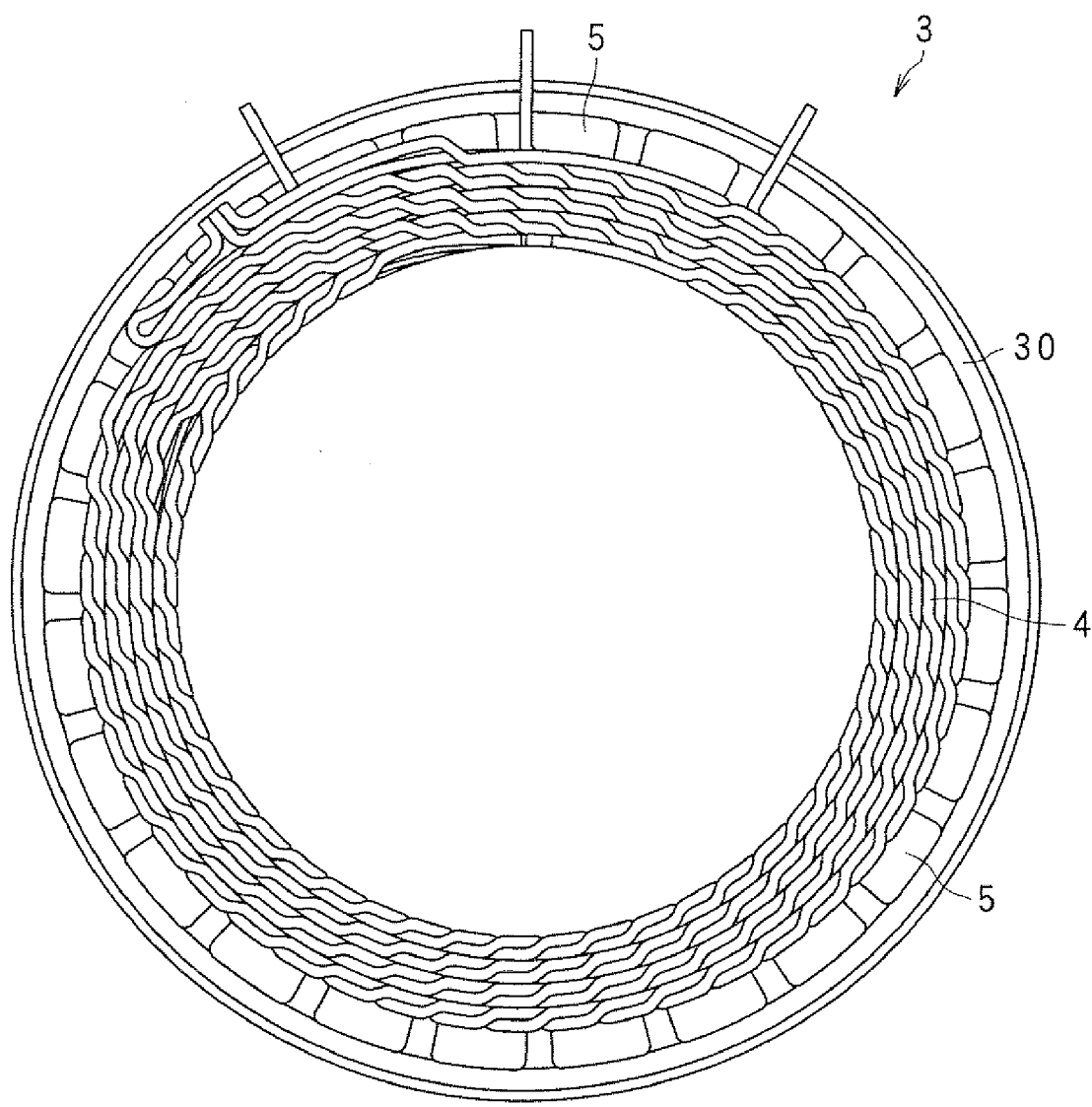
FIG. 2 is an end view of the stator.

Referring to FIG. 2, the stator 3 includes a stator core 30, a three-phase stator coil 4, and an insulating paper 5 interposed between the stator core 30 and the stator coil 4.

Figure 3:
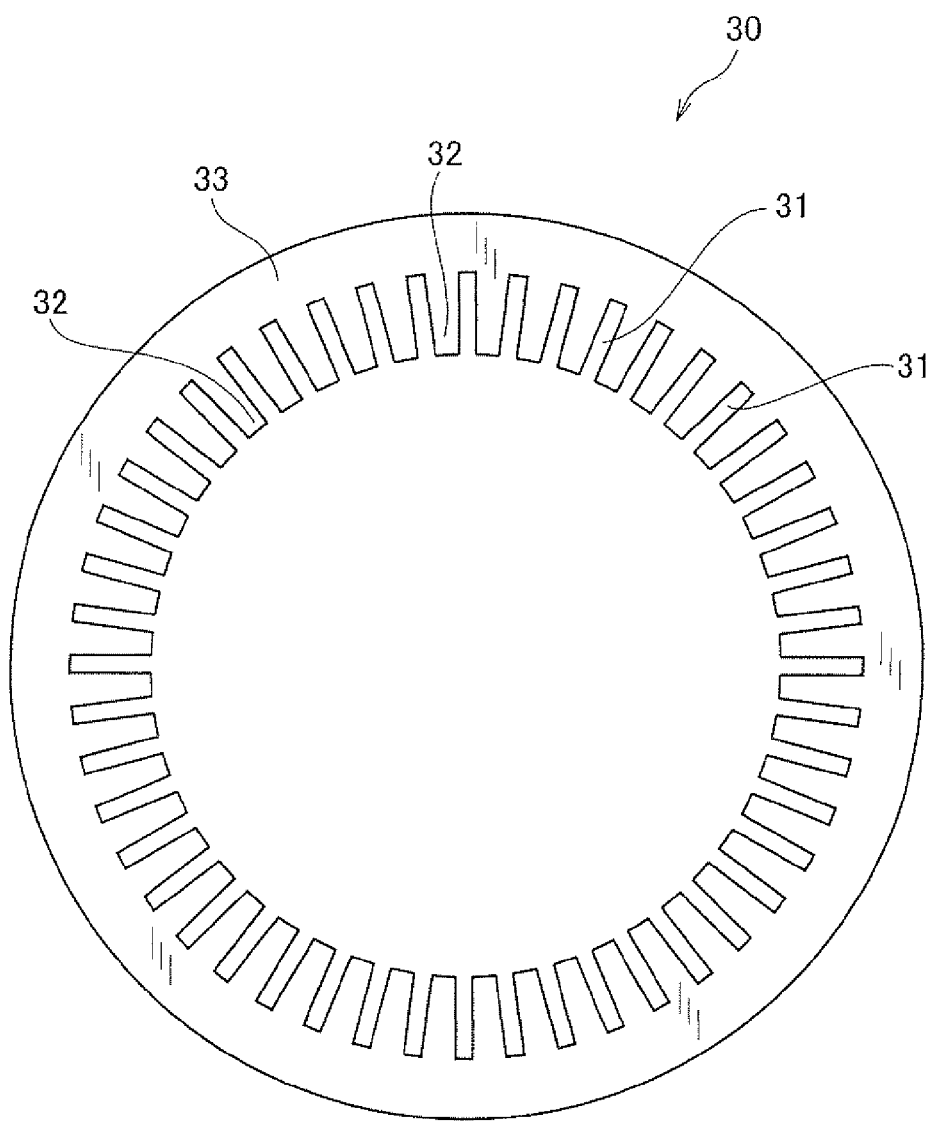
FIG. 3 is an end view of a stator core of the stator.

The stator core 30 has, as shown in FIG. 3, a hollow cylindrical shape with a plurality of slots 31 formed in the radially inner surface thereof. Each of the slots 31 has a depth in the radial direction of the stator core 30. In the present embodiment, for each of the eight magnetic poles of the rotor 2 and for each of the three phases of the stator coil 4, two slots 31 are provided. Accordingly, the total number of the slots 31 provided in the stator core 30 is equal to 48 (i.e., 8×3×2). Each of the slots 31 is defined by a circumferentially-adjacent pair of tooth portions 32 of the stator core 30. In addition, all of the tooth portions 32 are connected together by a back core portion 33 which is located on the radially outer side of the tooth portions 32.

The stator core 30 is formed by laminating a plurality of electromagnetic steel sheets with a plurality of insulting films interposed therebetween. In addition, the stator core 30 may also be formed by stacking a plurality of metal plates with a plurality of insulating members interposed therebetween.

Figure 4A:
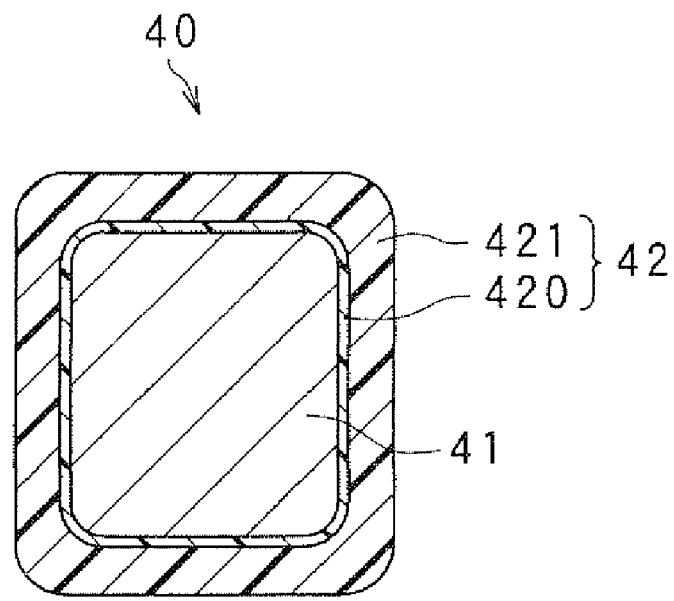
FIG. 4A is a cross-sectional view of an electric wire for forming a stator coil of the stator.

The stator coil 4 is formed by winding a plurality of electric wires 40 using a predetermined winding method. Each of the electric wires 40 includes, as shown in FIG. 4A, an electric conductor 41 and an insulating coat 42 that surrounds the electric conductor 41. In the present embodiment, the electric conductor 41 is made of copper. The insulating coat 42 is composed of an inner layer 420 and an outer layer 421.

With the two-layer structured insulating coat 42, it is possible to reliably insulate the electric wires 40 from one another without interposing insulating paper sheets between the electric wires 40. However, it is also possible to interpose insulating paper sheets between the electric wires 40 so as to enhance the electrical insulation therebetween.

Figure 4B:
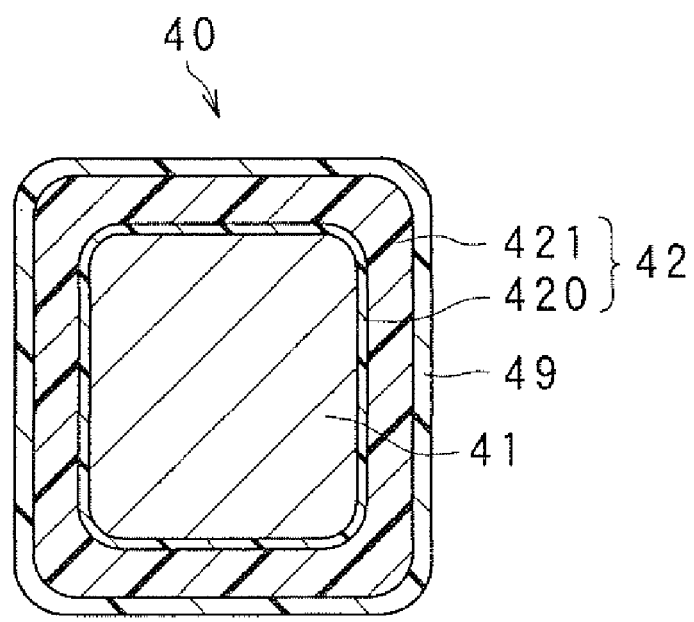
FIG. 4B is a cross-sectional view illustrating a modification of the electric wire.

Furthermore, as shown in FIG. 4B, it is also possible for each of the electric wires 40 to further include a fusible coat 49, which is made, for example, of epoxy resin, to cover the outer surface of the insulating coat 42. In this case, the fusible coats 49 of the electric wires 40 may be fused by the heat generated by operation of the dynamoelectric machine 1, thereby bonding together those parts of the electric wires 40 which are inserted in the same ones of the slots 31 of the stator core 30. As a result, those parts of the electric wires 40 are integrated into a rigid body, thereby enhancing the mechanical strength.

Figure 5:
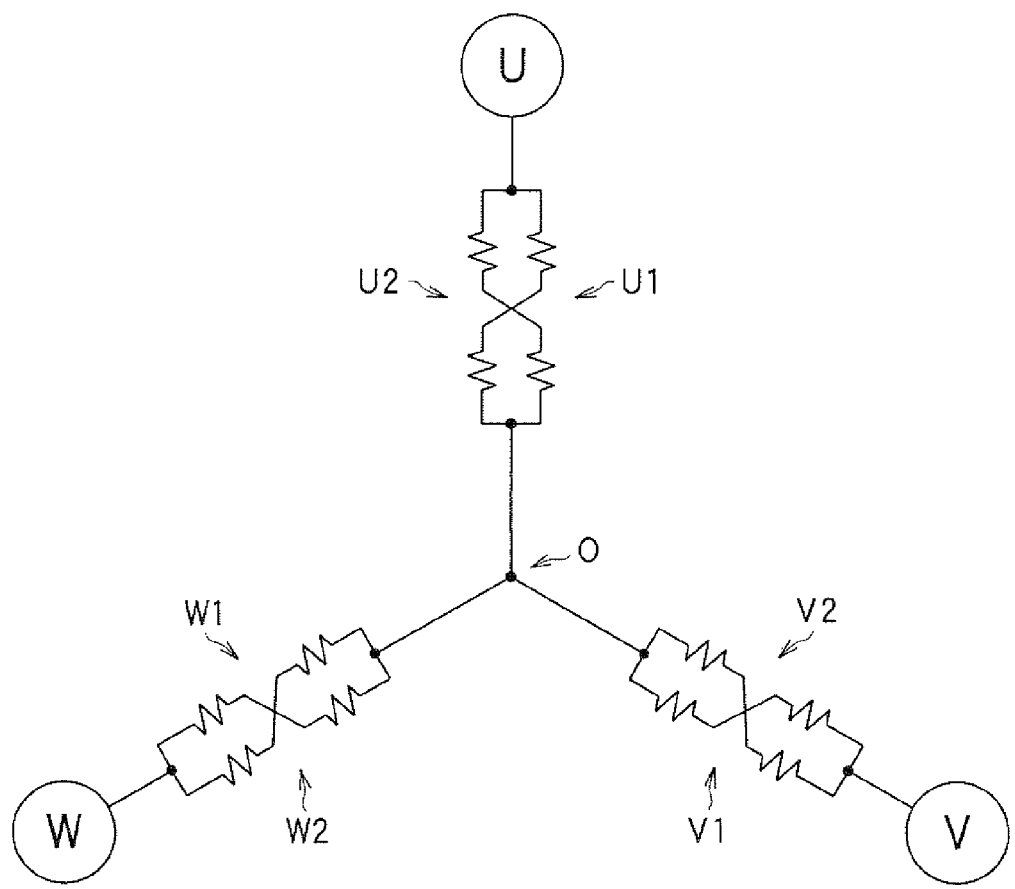
FIG. 5 is a schematic circuit diagram of the stator.

In the present embodiment, as shown in FIG. 5, the stator coil 4 is composed of six phase windings U1, U2, V1, V2, W1, and W2. The phase windings U1 and U2 are connected in parallel with each other to make up a U-phase winding of the stator coil 4. The phase windings V1 and V2 are connected in parallel with each other to make up a V-phase winding of the stator coil 4. The phase windings W1 and W2 are connected in parallel with each other to make up a W-phase winding of the stator coil 4. Moreover, the U-phase, V-phase, and W-phase windings are Y-connected to have a neutral point O therebetween.

Figure 6:
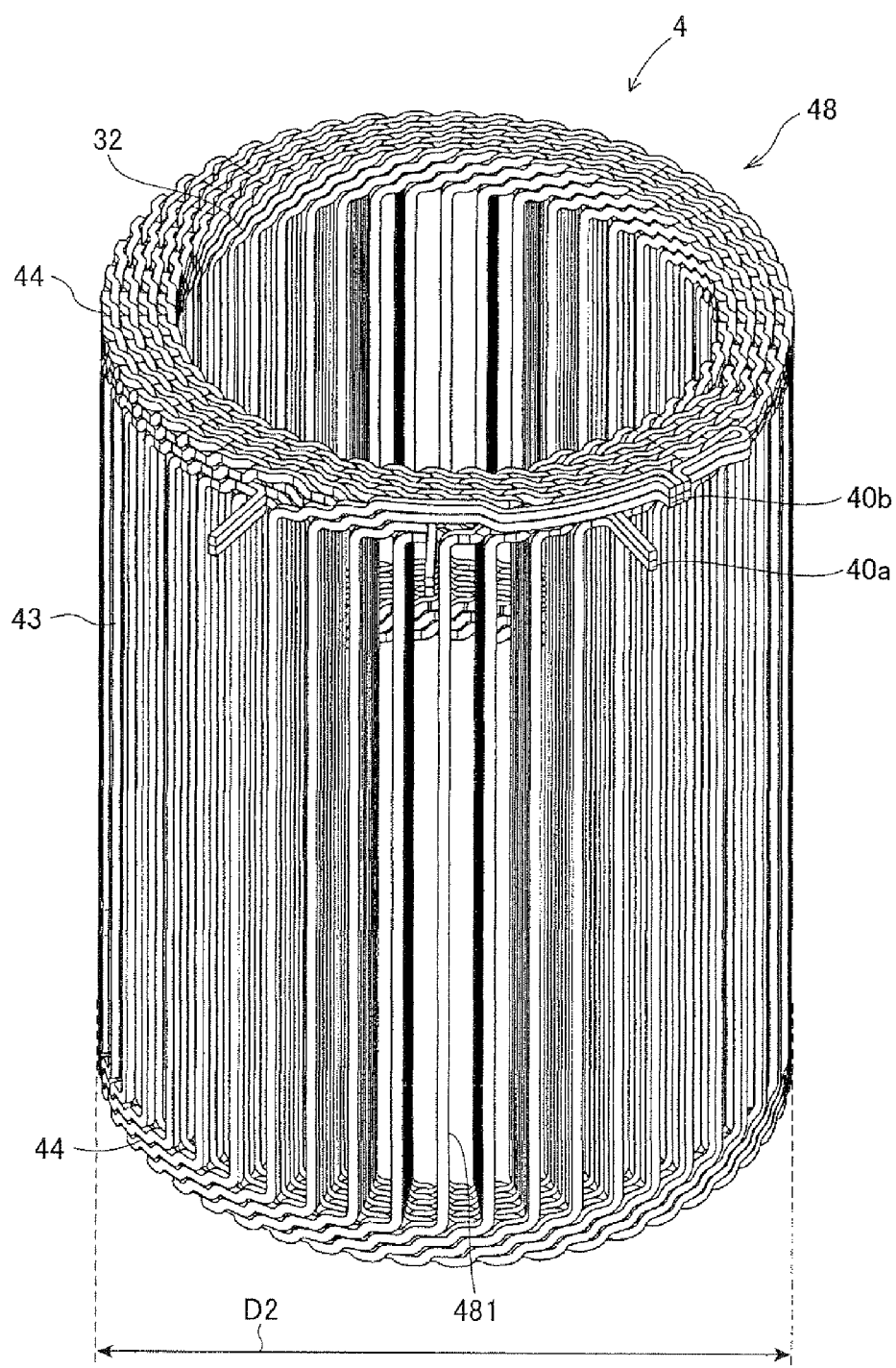
FIG. 6 is a perspective view of a hollow cylindrical electric wire assembly for forming the stator coil.
Figure 7:
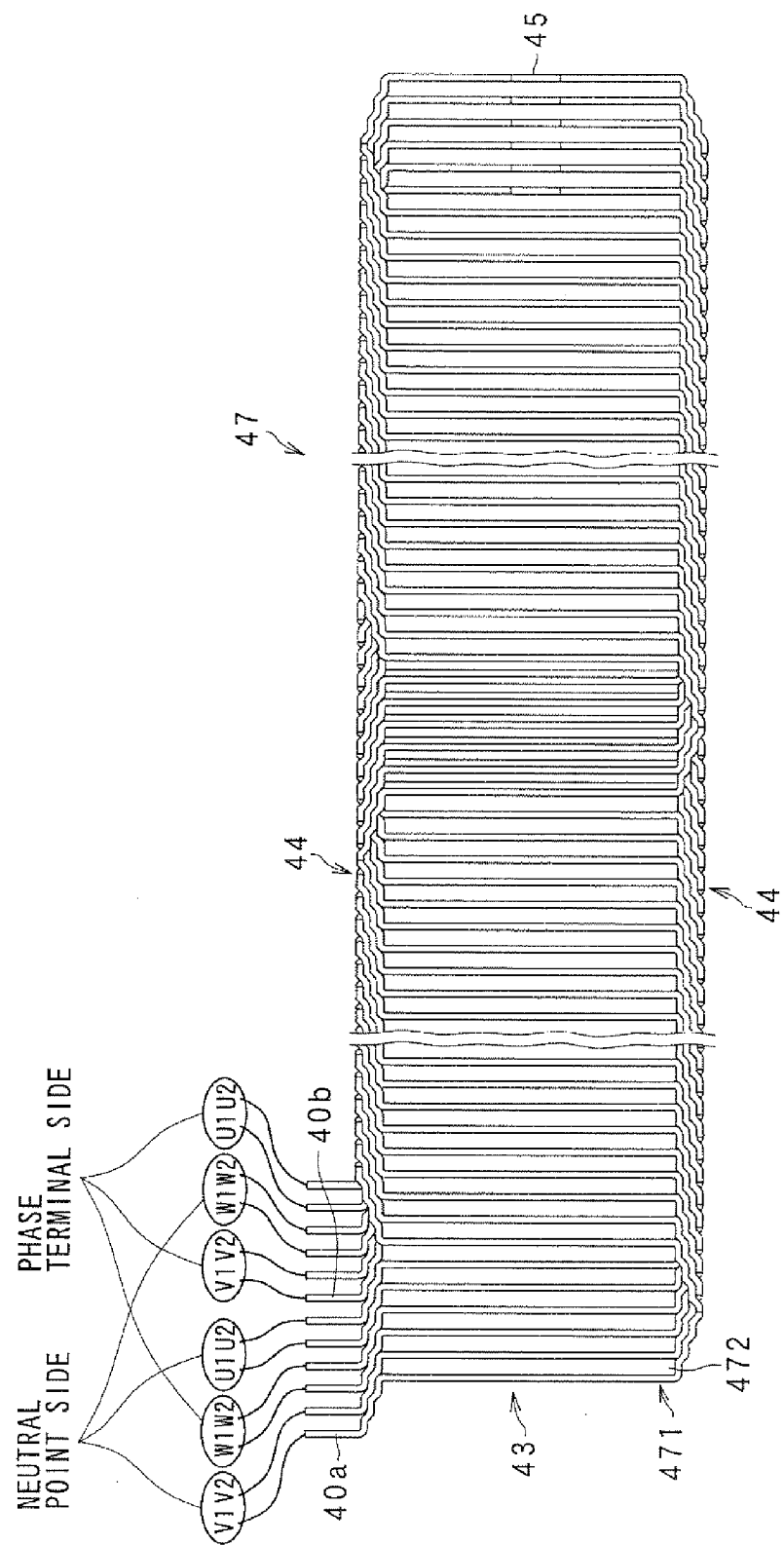
FIG. 7 is a plan view of a flat electric wire assembly for forming the hollow cylindrical electric wire assembly.

Moreover, the stator coil 4 is formed by mounting a hollow cylindrical electric wire assembly 48 as shown in FIG. 6 to the stator core 30. Further, the hollow cylindrical electric wire assembly 48 is formed by rolling a flat electric wire assembly 47 as shown in FIG. 7 by a predetermined number of turns.

Each of the electric wires 40 making up the stator coil 4 includes a plurality of in-slot portions 43, which are received in the slots 31 of the stator core 30, and a plurality of coil end portions 44 that are located outside of the slots 31 to connect the in-slot portions 43.

More specifically, in the present embodiment, the slots 31 of the stator core 30 are classified into eight groups each of which includes six circumferentially-adjacent slots 31. Moreover, for each of the electric wires 40, all of the in-slot portions 43 of the electric wire 40 are inserted in eight slots 31 that belong respectively to the eight groups and are spaced six slots 31 apart in the circumferential direction of the stator core 30. Furthermore, for each of the electric wires 40, each of the coil end portions 44 of the electric wire 40 protrudes from one of the axial ends of the stator core 30 and to connect a circumferentially-adjacent pair of the in-slot portions 43 of the electric wire 40. Consequently, each of the electric wires 40 is extended in the form of a wave in the circumferential direction of the stator core 30.

In the present embodiment, each of the phase windings of the stator coil 4 is formed by joining a pair of the electric wires 40 by, for example, welding. It should be noted that for the sake of convenience of explanation, the pair of the electric wires 40 will be respectively denoted by 40a and 40b hereinafter.

For each of the phase windings, the in-slot portions 43 of the electric wire 40a are inserted in the same slots 31 of the stator core 30 as the in-slot portions 43 of the electric wire 43b. Further, the radial positions of the in-slot portions 43 of the electric wire 40a alternate with those of the in-slot portions 43 of the electric wire 40b in the circumferential direction of the stator core 30. Moreover, the electric wire 40a is wound around the stator core 30 in an opposite direction to the electric wire 40b. Furthermore, as shown in FIG. 7, the joining portion 45 between the electric wires 40a and 40b is formed as a common in-slot portion 43 to the electric wires 40a and 40b. In addition, at the joining portion 45, the winding direction of the electric wire 40a is inverted to that of the electric wire 40b.

As described previously, in the present embodiment, the stator coil 4 is composed of six phase windings. Therefore, as shown in FIG. 7, six pairs of the electric wires 40a and 40b are included in the stator coil 4 to respectively make up the phase windings U1, U2, V1, V2, W1, and W2.

Moreover, for each of the phase windings U1, U2, V1, V2, W1, and W2, the end of the electric wire 40a on the opposite side to the neutral point O is joined, through the joining portion 45, to the end of the electric wire 40b on the opposite side to the phase terminal.

Figure 8:
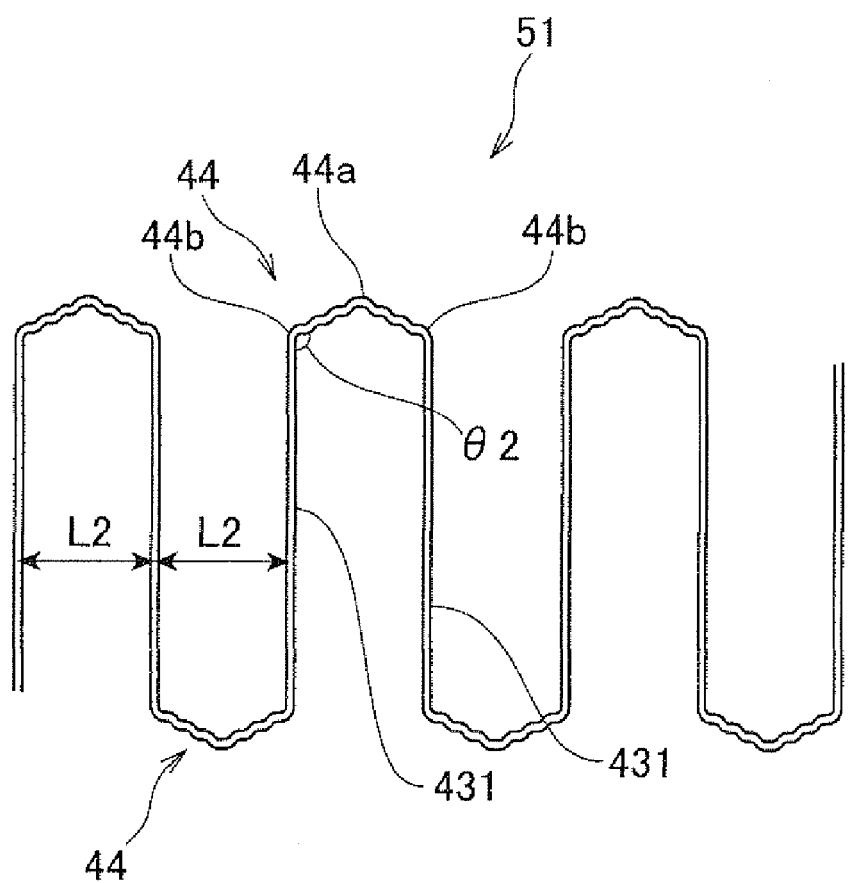
FIG. 8 is a plan view of part of a wave-shaped electric wire for forming the flat electric wire assembly.

FIG. 8 shows a wave-shaped electric wire 51 which is obtained by shaping a straight electric wire. The shaping process will be described in detail later. In the present embodiment, a total of twelve wave-shaped electric wires 51 are assembled together to form the flat electric wire assembly 47 as shown in FIG. 7. In other words, each of the wave-shaped electric wires 51 makes up one of the electric wires 40 (or 40a, 40b) included in the flat electric wire assembly 47.

As shown in FIG. 8, the wave-shaped electric wire 51 includes a plurality of straight portions 431, which are parallel to each other, and a plurality of connecting portions 44 each of which connects an adjacent pair of the straight portions 431. Each of the straight portions 431 makes up one of the in-slot portions 43 of the electric wire 40, while each of the connecting portions 44 makes up one of the coil end portions 44 of the same.

Moreover, each of the connecting portions 44 has an apex 44a, which is centrally located between and furthest from the adjacent pair of the straight portions 431, and a pair of intersections 44b at which the connecting portion 44a intersects with the adjacent pair of the straight portions 431. Furthermore, each of the connecting portions 44 is stepped between the apex 44a and each of the intersections 44b.

Figure 9:
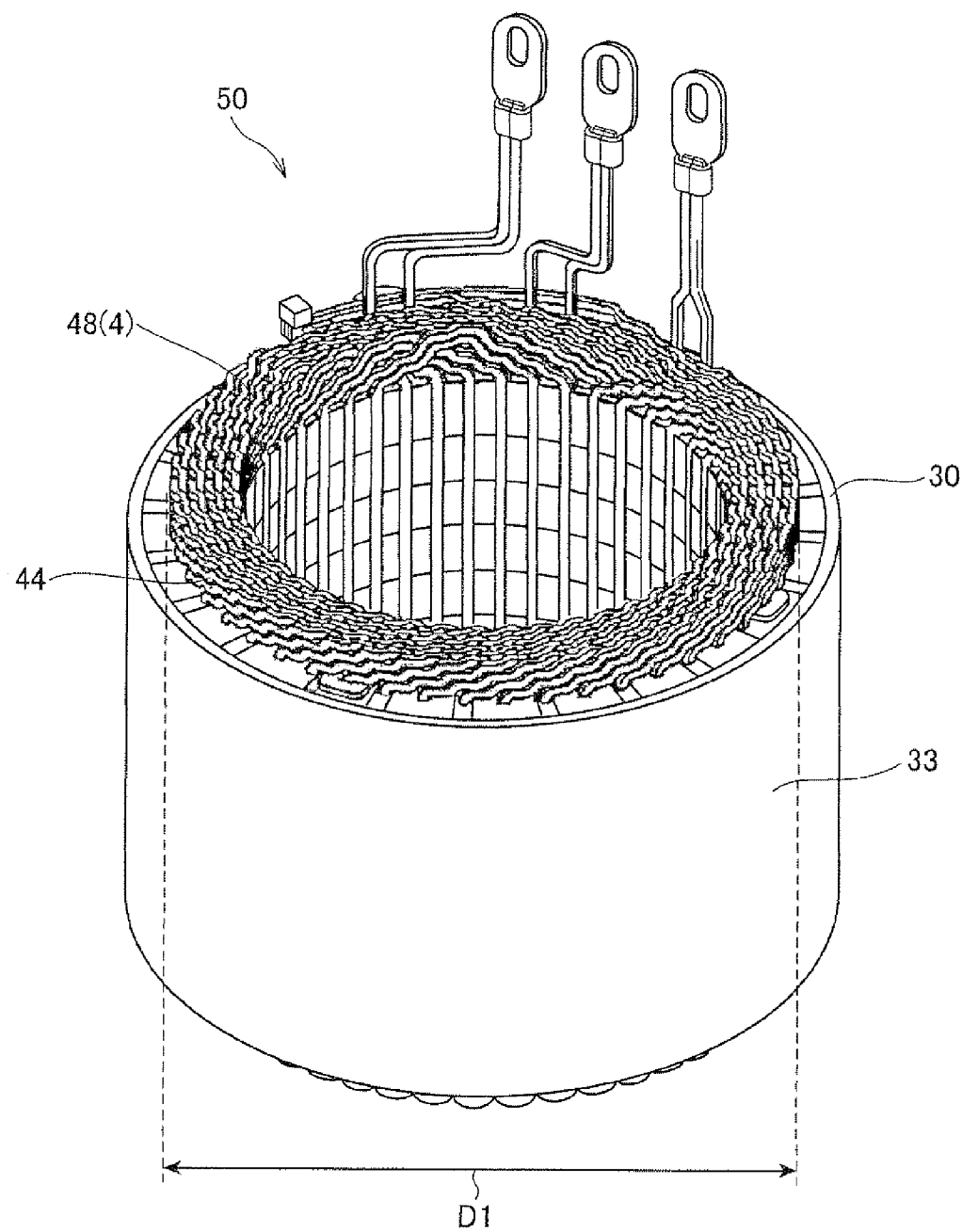
FIG. 9 is a perspective view of a structural body obtained by mounting the hollow cylindrical electric wire assembly of FIG. 6 to the stator core of FIG. 3.

FIG. 9 shows a structural body 50 that is obtained by mounting the hollow cylindrical electric wire assembly 48 shown in FIG. 6 to the stator core 30 shown in FIG. 3. The mounting process will be described in detail later. The structural body 50 makes up the stator 3 of the dynamoelectric machine 1 after being assembled to the other parts of the dynamoelectric machine 1.

Next, the method of manufacturing the stator 3 according to the present embodiment will be described. The method includes a shaping step, an assembling step, a rolling step, and a mounting step.

1. Shaping Step

In this step, twelve straight electric wires 60 are shaped, using a plurality of pairs of male jigs 511 and female jigs 512, to form the twelve wave-shaped electric wires 51 described above.

Figure 10A:
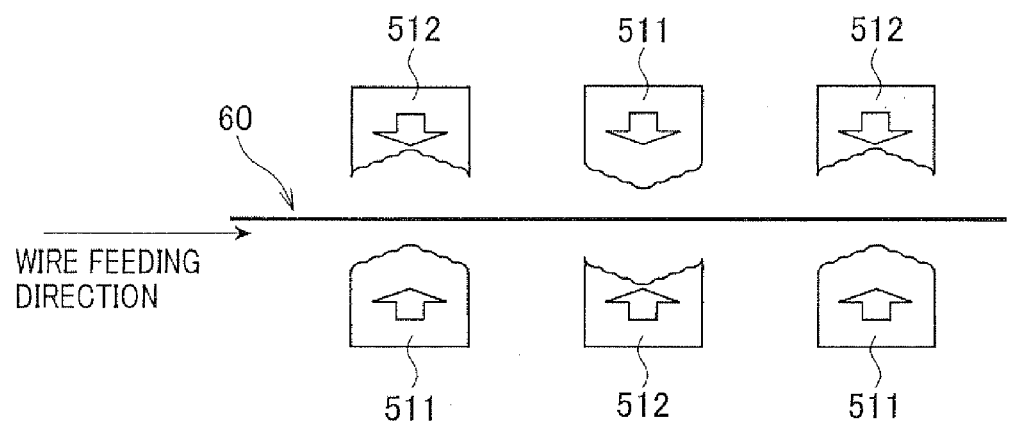
FIGS. 10A-10C are schematic diagrams together illustrating a shaping step in manufacturing the stator core.
Figure 10B:
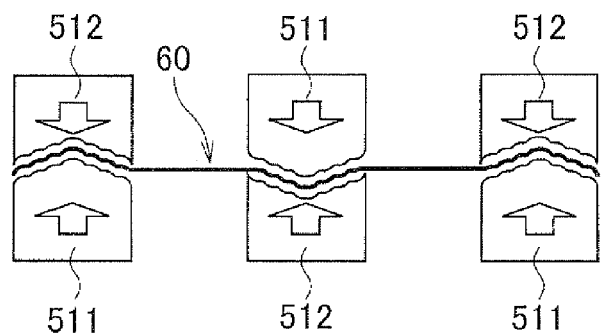
Figure 10C:
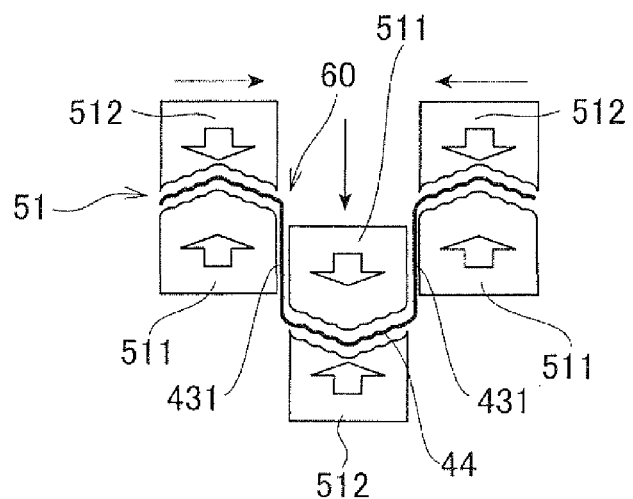

As shown in FIGS. 10A-10C, each of the male jigs 511 has a convex end with steps formed thereon in a predetermined pattern. On the other hand, each of the female jigs 512 has a concave end with steps formed thereon in a predetermined pattern. In addition, all of the straight electric wires 60 are shaped in the same way, and therefore only the process of shaping one of the straight electric wires 60 will be described bellow.

First, referring to FIG. 10A, the straight electric wire 60 is fed to extend between the male jigs 511 and the female jigs 512. More specially, each pair of the male and female jigs 511 and 512 is set so that the convex end of the male jig 511 faces the concave end of the female jig 512 with a gap formed therebetween. The straight electric wire 60 is fed to extend through all of the gaps formed between the male jigs 511 and the female jigs 512. In addition, on each side of the straight electric wire 60, the male jigs 511 are alternately arranged with the female jigs 512 in the feeding direction of the straight electric wire 60.

Then, referring to FIG. 10B, the straight electric wire 60 is pressed between the male jigs 511 and the female jigs 512, thereby forming the connecting portions 44 of the wave-shaped electric wire 51.

Thereafter, with the straight electric wire 60 retained between the male jigs 511 and the female jigs 512, the pairs of the male and female jigs 511 and 512 are moved relative to each other, thereby forming the straight portions 431 of the wave-shaped electric wire 51. For example, in FIG. 10C, the centrally-located pair of the male and female jigs 511 and 512 is moved downward, while the two side-located pairs of the male and female jigs 511 and 512 are moved toward each other.

Finally, the straight electric wire 60, which has been shaped into the wave-shaped electric wire 51 as shown in FIG. 8, is released from the pairs of the male and female jigs 511 and 512.

In addition, in the wave-shaped electric wire 51, the pitch L2 between the straight portions 431 is determined by the dimensions of the male and female jigs 511 and 512. The interior angles $\theta 2$ at the insertions 44b, which are greater than 90°, are also determined by the dimensions of the male and female jigs 511 and 512. In addition, the apexes 44a are not flat, but tapered in the lateral direction of the wave-shaped electric wire 51 (i.e., the axial direction of the stator core 30).

2. Assembling Step

In this step, the twelve wave-shaped electric wires 51 are assembled together, forming the flat electric wire assembly 47 shown in FIG. 7. In the flat electric wire assembly 47, each of the wave-shaped electric wires 51 makes up one of the electric wires 40a and 40b.

Moreover, in the flat electric wire assembly 47, six pairs of the electric wires 40a and 40b are arranged in the longitudinal direction of the assembly 47. For each of the six pairs, one of the ends of the electric wire 40a is joined, for example by welding, to one of the ends of the electric wire 40b, forming the joining portion 45. In addition, the process of joining the ends of the electric wires 40a and 40b may be performed either before or after the formation of the flat electric wire assembly 47.

Each pair of the electric wires 40a and 40b includes a plurality of straight overlapped portions 471 that are formed by overlapping the straight portions 43 of the electric wire 40a respectively with those of the electric wire 40b. In addition, the joining portion 45, which makes up a common straight portion 43 to the electric wires 40a and 40b, is not overlapped with any other straight portions 43. The straight portion 43 of the electric wire 40a which is located furthest from the joining portion 45 is also not overlapped with any other straight portions 43. In other words, for each pair of the electric wires 40a and 40b, both the straight portions 43 located at the longitudinal ends of the pair are not overlapped with any other straight portions 43.

3. Rolling Step

In this step, the flat electric wire assembly 47 is rolled, around a cylindrical core member (not shown) with the joining portions 45 located on the core member side, by a predetermined number of turns (e.g., four turns in the present embodiment). As a result, the hollow cylindrical electric wire assembly 48 is obtained which is shown in FIG. 6.

In addition, in this step, the flat electric wire assembly 47 is rolled while plastically deforming the connecting portions 44 of the electric wires 40a and 40b into a predetermined winding radius. It should be noted that shaping dies or shaping rollers may be employed in this step to plastically deform the connecting portions 44 of the electric wires 40a and 40b.

The hollow cylindrical electric wire assembly 48 includes a plurality of (e.g., 48 in the present embodiment) straight stacked portions 481, in each of which a plurality of (e.g., four) the straight overlapped portions 471 of the flat electric wire assembly 47 are stacked together in the radial direction of the assembly 48. More specifically, the number of the straight portions 43 of the electric wires 40a and 40b in each of the straight stacked portions 481 is equal to twice the predetermined number of turns of the assembly 48 (i.e., 2×4 in the present embodiment). The straight stacked portions 481 each extend parallel to the axial direction of the assembly 48, and are spaced at predetermined intervals in the circumferential direction of the same. In addition, the outer diameter of the hollow cylindrical electric wire assembly 48 is equal to D2 as shown in FIG. 6.

4. Mounting Step

In this step, the hollow cylindrical electric wire assembly 48 is mounted to the stator core 30 which has a unitary (or one-piece) structure, thereby forming the structural body 50 shown in FIG. 9.

Figure 11A:
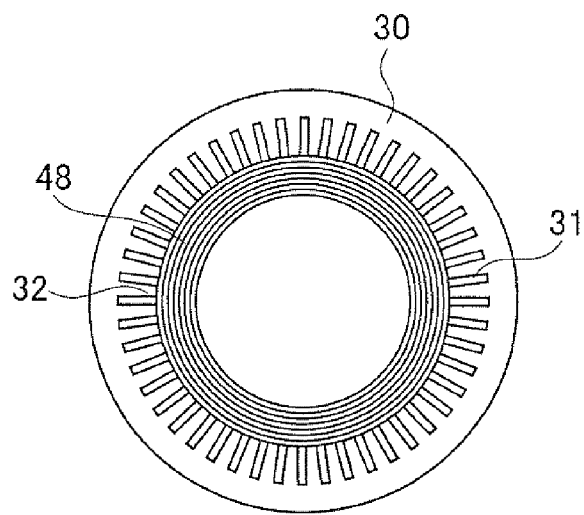
FIGS. 11A and 11B are schematic diagrams together illustrating a mounting step in manufacturing the stator core.
Figure 11B:
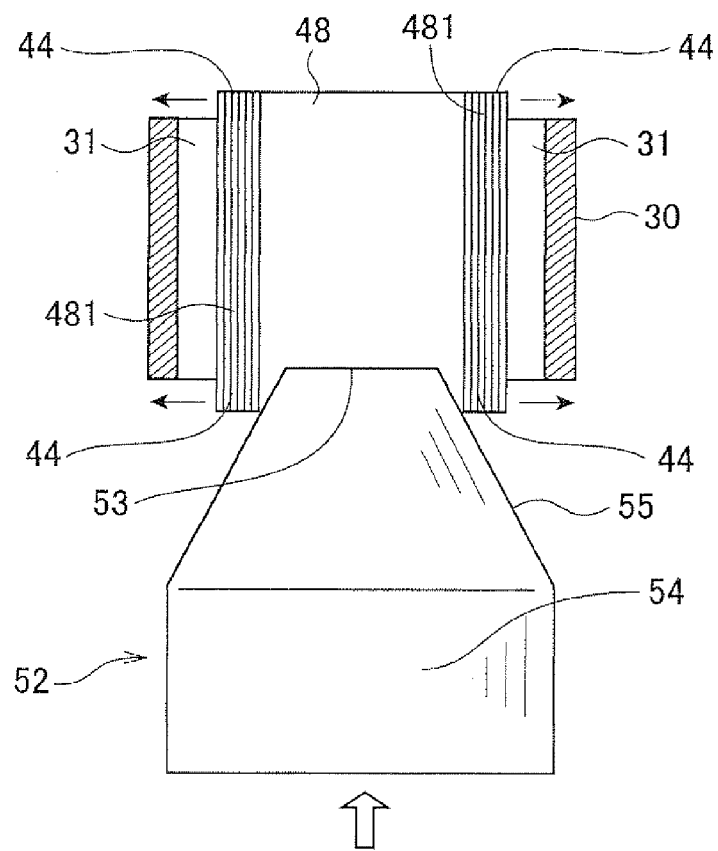

FIG. 11A is a schematic end view of the stator core 30 with the hollow cylindrical electric wire assembly 48 placed radially inside thereof. FIG. 11B is a schematic cross-sectional view showing an expanding jig 54 placed radially inside of the hollow cylindrical electric wire assembly 48.

In this step, the expanding jig 52 is used to radially expand the hollow cylindrical electric wire assembly 48, thereby mounting the same to the stator core 30. The expanding jig 52 includes a small-diameter end 53 having a diameter smaller than the inner diameter of the hollow cylindrical electric wire assembly 48, a large-diameter portion 54 having a diameter substantially equal to the inner diameter of the stator core 30, and a taper portion 55 that tapers from the large-diameter portion 54 to the small-diameter end 53.

First, as shown in FIG. 11A, the hollow cylindrical electric wire assembly 48 is placed radially inside of the stator core 30, and positioned in the circumferential direction of the stator core 30 so that each of the straight stacked portions 481 of the assembly 48 is radially aligned with a corresponding one of the slots 31 of the stator core 30.

Then, as shown in FIG. 11B, the expanding jig 52 is inserted, from the small-diameter end 53, into the radially inside of the hollow cylindrical electric wire assembly 48. With the insertion of the expanding jig 52, the hollow cylindrical electric wire assembly 48 is radially expanded by the taper portion 55 of the expanding jig 52, and the straight stacked portions 481 of the assembly 48 are respectively inserted into the slots 31 of the stator core 30. It should be noted that with the insertion of the expanding jig 52, the taper portion 55 comes to press radially outward the hollow cylindrical electric wire assembly 48 over the entire axial length of the assembly 48. In other words, in the present embodiment, the expanding jig 52 presses radially outward not only the connecting portions 44 but also the straight stacked portions 481 of the hollow cylindrical electric wire assembly 48.

Moreover, with the radial expansion of the hollow cylindrical electric wire assembly 48, the circumferential spaces between adjacent pairs of the straight stacked portions 481 of the assembly 48 are increased, and the axial heights of the connecting portions 44 are decreased. Further, the axial heights of the connecting portions 44 are decreased with deformation of the connecting portions 44 only at the apexes 44a and the insertions 44b. More specifically, the apexes 44a of the connecting portions 44 are flattened, and the interior angles at the insertions 44b of the connecting portions 44 are decreased from $\theta 2$ to $\theta 1$ which is almost equal to 90°.

When the insertion of the expanding jig 52 has progressed so that the large-diameter portion 54 occupies the entire axial length of the hollow cylindrical electric wire assembly 48, the straight stacked portions 481 of the assembly 48 are completely inserted in the corresponding slots 31 of the stator core 30. Then, the expanding jig 52 is pulled back out of the hollow cylindrical electric wire assembly 48.

As a result, the structural body 50 is obtained which makes up the stator 3 of the dynamoelectric machine 1 after being assembled to the other parts of the dynamoelectric machine 1.

Figure 12:
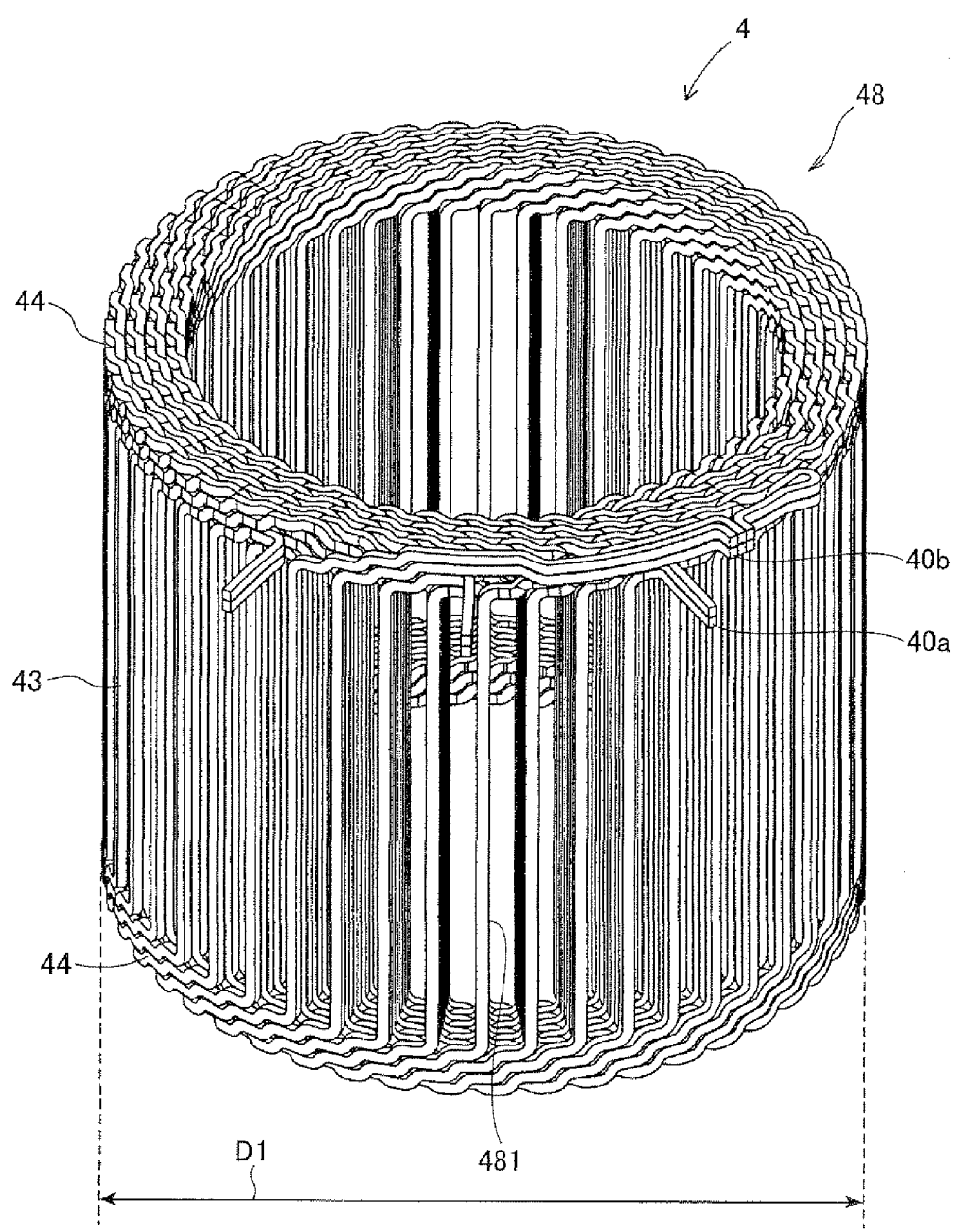
FIG. 12 is a perspective view of the hollow cylindrical electric wire assembly after being radially expanded.
Figure 13:
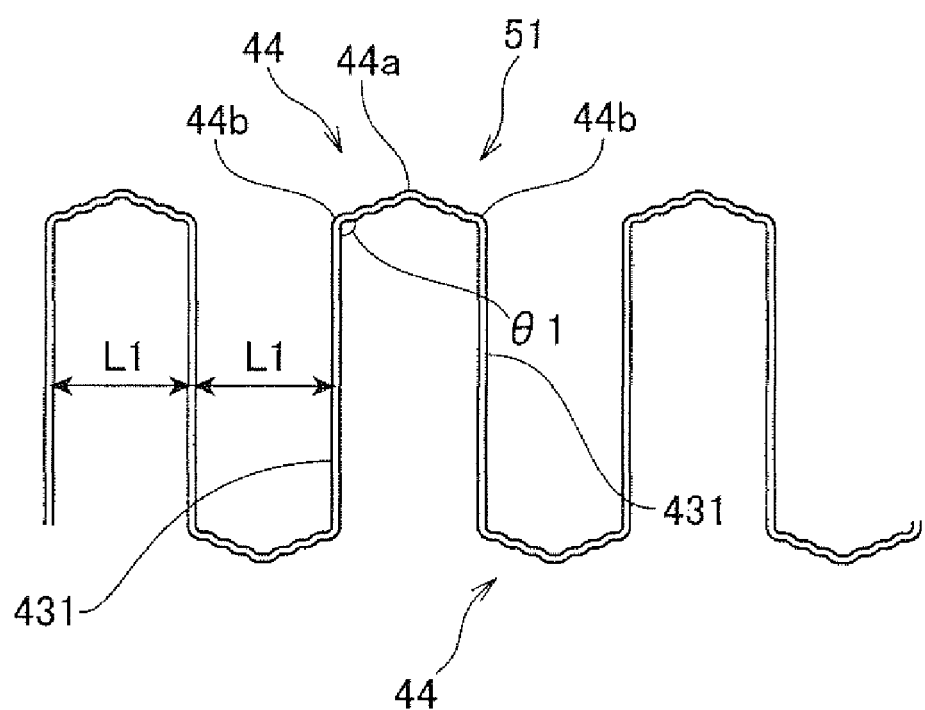
FIG. 13 is a plan view showing the developed shape of one of the wave-shaped electric wires included in the hollow cylindrical electric wire assembly of FIG. 12.

FIG. 12 shows the hollow cylindrical electric wire assembly 48 after being radially expanded. FIG. 13 shows the developed shape of one of the wave-shaped electric wires 51 (i.e., one of the electric wires 40a and 40b) included in the radially-expanded hollow cylindrical electric wire assembly 48.

As shown in FIG. 12, after being radially expanded, the outer diameter of the hollow cylindrical electric wire assembly 48 becomes D1. Moreover, as shown in FIG. 13, the pitch between the straight portions 431 in each of the wave-shaped electric wires 51 becomes L1. In comparison, as described previously, before being radially expanded, the outer diameter of the hollow cylindrical electric wire assembly 48 was D2; the pitch between the straight portions 431 in each of the wave-shaped electric wires 51 was L2. Moreover, L2 is substantially equal to (D2×L1)/D1.

Based on the above dimensional relationship, it is possible to suitably set the values of D2 and L2 for the before-expanding hollow cylindrical electric wire assembly 48 according to the desired values of D1 and L1 for the after-expanding hollow cylindrical electric wire assembly 48.

The above-described method of manufacturing the stator 3 according to the present embodiment has the following advantages.

According to the method, the hollow cylindrical electric wire assembly 48 is mounted to the stator core 30 by radially expanding the hollow cylindrical electric wire assembly 48 while inserting the straight stacked portions 481 of the assembly 48 into the corresponding slots 31 of the stator core 30.

Therefore, with the above method, it is possible to mount the hollow cylindrical electric wire assembly 48 to the stator core 30 that has the unitary structure. Consequently, compared to the case of employing the divided stator core structure as disclosed in Japanese Patent First Publication No. 2002-51485, it is possible to realize a more suitable magnetic circuit of the stator 3, thereby improving the performance of the dynamoelectric machine 1. Moreover, it is unnecessary to shrinkage-fit a hollow cylindrical case onto the radially outer surface of the stator core 30 as in the case of employing the divided stator core structure.

Furthermore, according to the above method, it is possible to minimize the air gaps between the wave-shaped electric wires 51 (i.e., the electric wires 40a and 40b) in the assembling and rolling steps. Consequently, the size of the stator coil 4 (i.e., the hollow cylindrical electric wire assembly 48) can be minimized, and the performance of the stator 3 can be improved.

Moreover, in the present embodiment, in the mounting step, the hollow cylindrical electric wire assembly 48 is radially expanded by pressing it radially outward over its entire axial length. More specifically, the expanding jig 52 presses radially outward not only the connecting portions 44 but also the straight stacked portions 481 of the hollow cylindrical electric wire assembly 48.

Consequently, it is possible to minimize the air gaps between the wave-shaped electric wires 51 included in the hollow cylindrical electric wire assembly 48 over the entire axial length of the assembly 48. Moreover, unlike in the case of the method disclosed in Japanese Patent No. 3982446, it is unnecessary to set large axial heights of the connecting portions 44. As a result, it is possible to reduce the axial dimension of the stator 3 and improve the performance of the stator 3.

In the present embodiment, in the mounting step, with the radial expansion of the hollow cylindrical electric wire assembly 48, the circumferential spaces between adjacent pairs of the straight stacked portions 481 of the assembly 48 are increased, and the axial heights of the connecting portions 44 are decreased.

Accordingly, with the method according the present embodiment, it is possible to minimize the axial dimension of the stator coil 4 (i.e., the hollow cylindrical electric wire assembly 48) and the air gaps between the coil end portions 44 (i.e., the connecting portions 44).

Further, in the present embodiment, each of the connecting portions 44 has the apex 44a, which is centrally located between and furthest from the pair of the straight portions 431 connected by the connecting portion 44, and the pair of intersections 44b at which the connecting portion 44 intersects with the pair of the straight portions 431. Each of the connecting portions 44 is stepped between the apex 44a and each of the intersections 44b. In the mounting step, the axial height of each of the connecting portions 44 is decreased with deformation of the connecting portion 44 only at the apex 44a and the intersections 44b.

Since each of the connecting portions 44 is deformed only at the apex 44a and the intersections 44b in the mounting step, it is possible to ensure high dimensional accuracy of the connecting portions 44 (i.e., the coil end portions 44 of the stator coil 4).

In the present embodiment, in the mounting step, the hollow cylindrical electric wire assembly 48 is radially expanded using the expanding jig 52. The expanding jig 52 includes the small-diameter end 53 having a diameter smaller than the inner diameter of the hollow cylindrical electric wire assembly 48, the large-diameter portion 54 having a diameter substantially equal to the inner diameter of the stator core 30, and the taper portion 55 that tapers from the large-diameter portion 54 to the small-diameter end 53. In radially expanding the hollow cylindrical electric wire assembly 48, the expanding jig 52 is inserted, from the small-diameter end 53, into the radially inside of the assembly 48, until the large-diameter portion 54 comes to occupy the entire axial length of the assembly 48.

With the use of the above expanding jig 52, the hollow cylindrical electric wire assembly 48 can be gradually radially expanded over its entire axial length. Consequently, the hollow cylindrical electric wire assembly 48 can be reliably mounted to the stator core 30 without receiving any damage in the mounting step.

Second Embodiment

In this embodiment, the hollow cylindrical electric wire assembly 48 is radially expanded using an expanding jig 521 which is different from the expanding jig 52 used in the first embodiment.

Figure 14A:
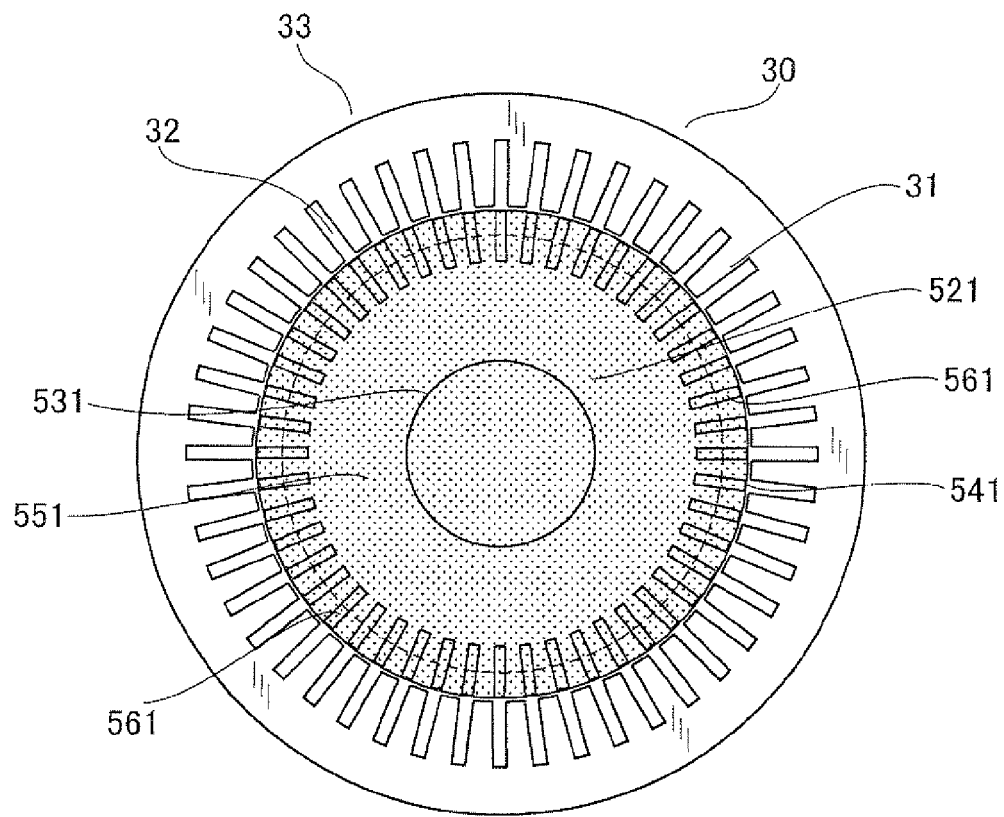
FIGS. 14A and 14B are schematic diagrams together illustrating a mounting step in manufacturing the stator core according to the second embodiment of the invention.
Figure 14B:
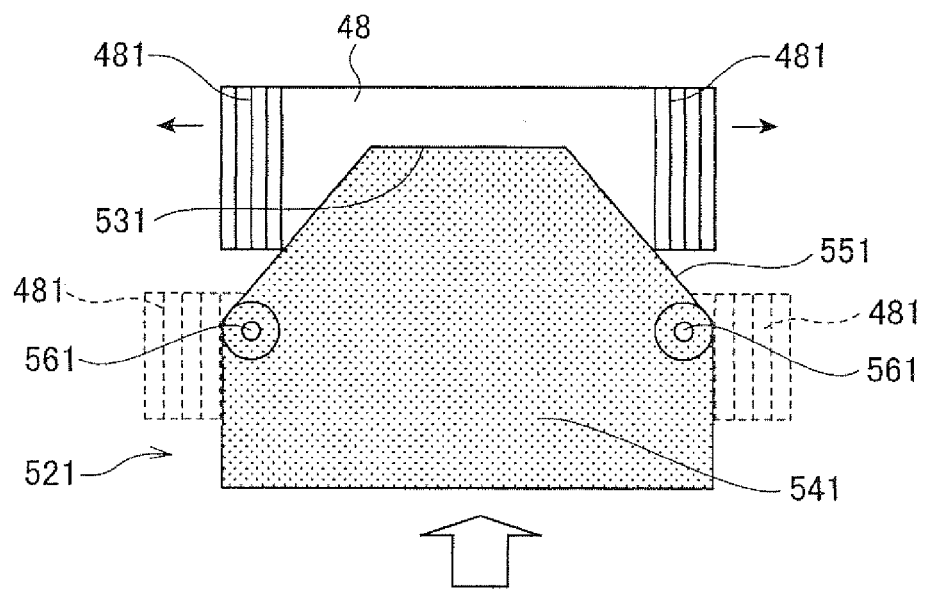

FIG. 14A illustrates the positioning of the expanding jig 521 with respect to the stator core 30. FIG. 14B illustrates the expanding jig 521 put into operation.

As seen from FIGS. 14A and 14B, the expanding jig 521 includes a small-diameter end 531 having a diameter smaller than the inner diameter of the hollow cylindrical electric wire assembly 48, a large-diameter portion 541 having a diameter substantially equal to the inner diameter of the stator core 30, a taper portion 551 that tapers from the large-diameter portion 541 to the small-diameter end 531, and a plurality of rollers 561 provided at the boundary between the large-diameter portion 541 and the taper portion 551. The rollers 561 are configured to be rollable in the axial direction of the expanding jig 521 (i.e., in the axial direction of the stator core 30). Moreover, in the present embodiment, the number of the rollers 561 is equal to the number of the slots 31 of the stator core 30.

In the mounting step, the hollow cylindrical electric wire assembly 48 is first placed radially inside of the stator core 30, and positioned in the circumferential direction of the stator core 30 so that each of the straight stacked portions 481 of the assembly 48 is radially aligned with a corresponding one of the slots 31 of the stator core 30.

Further, as shown in FIGS. 14A and 14B, the expanding jig 521 is placed to have the small-diameter end 531 located radially inside of the hollow cylindrical electric wire assembly 48, and positioned in the circumferential direction of the stator core 30 so that each of the rollers 561 is radially aligned with a corresponding one of the slots 31 of the stator core 30.

Then, the expanding jig 521 is further inserted into the radially inside of the hollow cylindrical electric wire assembly 48. When the insertion of the expanding jig 521 has progressed so that the rollers 521 reaches the hollow cylindrical electric wire assembly 48, the rollers 521 comes to roll on the straight stacked portions 481 of the assembly 48, thereby reducing friction between the expanding jig 521 and the assembly 48.

Moreover, with the insertion of the expanding jig 521, the hollow cylindrical electric wire assembly 48 is radially expanded by the taper portion 551 of the expanding jig 521, and the straight stacked portions 481 of the assembly 48 are respectively inserted into the slots 31 of the stator core 30.

When the insertion of the expanding jig 521 has further progressed so that the large-diameter portion 541 occupies the entire axial length of the hollow cylindrical electric wire assembly 48, the straight stacked portions 481 of the assembly 48 are completely inserted in the corresponding slots 31 of the stator core 30. Then, the expanding jig 521 is pulled back out of the hollow cylindrical electric wire assembly 48. As a result, the structural body 50 is obtained which makes up the stator 3 of the dynamoelectric machine 1 after being assembled to the other parts of the dynamoelectric machine 1.

As described above, in the present embodiment, the rollers 561 provided in the expanding jig 521 reduce the friction between the expanding jig 521 and the hollow cylindrical electric wire assembly 48. As a result, it is possible for the expanding jig 521 to smoothly radially expand the hollow cylindrical electric wire assembly 48 without damaging the surfaces of the straight stacked portions 481 of the assembly 48.

While the above particular embodiments of the invention have been shown and described, it will be understood by those skilled in the art that various modifications, changes, and improvements may be made without departing from the spirit of the invention.

What is claimed is:

1. A method of manufacturing a stator for a dynamoelectric machine, the method comprising the following steps:

preparing a plurality of electric wires and a stator core, wherein the stator core has a hollow cylindrical shape and includes a plurality of slots formed in a radially inner surface thereof;

shaping the electric wires to obtain a plurality of shaped electric wires, wherein each of the shaped electric wires includes a plurality of straight portions, which are parallel to each other, and a plurality of connecting portions each of which connects an adjacent pair of the straight portions;

assembling the shaped electric wires to form a flat electric wire assembly, wherein the flat electric wire assembly includes a plurality of straight overlapped portions each of which is formed by overlapping a predetermined number of the straight portions of the shaped electric wires;

rolling the flat electric wire assembly by a predetermined number of turns to form a hollow cylindrical electric wire assembly, wherein the hollow cylindrical electric wire assembly has an outer diameter smaller than an inner diameter of the stator core and includes a plurality of straight stacked portions each of which is formed by radially stacking a predetermined number of the straight overlapped portions of the flat electric wire assembly; and mounting the hollow cylindrical electric wire assembly to the stator core to form the stator which includes the stator core and a multi-phase stator coil made up of the hollow cylindrical electric wire assembly, wherein the mounting step includes placing the hollow cylindrical electric wire assembly radially inside of the stator core so that each of the straight stacked portions of the hollow cylindrical electric wire assembly is radially aligned with a corresponding one of the slots of the stator core, and radially expanding the hollow cylindrical electric wire assembly to insert the straight stacked portions of the hollow cylindrical electric wire assembly into the corresponding slots of the stator core.

2. The method as set forth in claim 1, wherein in the mounting step, the hollow cylindrical electric wire assembly is radially expanded by pressing it radially outward over its entire axial length.

3. The method as set forth in claim 1, wherein in the mounting step, with the radial expansion of the hollow cylindrical electric wire assembly, circumferential spaces between adjacent pairs of the straight stacked portions are increased and axial heights of the connecting portions are decreased.

4. The method as set forth in claim 3, wherein each of the connecting portions has an apex, which is centrally located between and furthest from the pair of the straight portions connected by the connecting portion, and a pair of intersections at which the connecting portion intersects with the pair of the straight portions, each of the connecting portions is stepped between the apex and each of the intersections, and in the mounting step, the axial height of each of the connecting portions is decreased with deformation of the connecting portion only at the apex and the intersections.

5. The method as set forth in claim 1, wherein in the mounting step, the hollow cylindrical electric wire assembly is radially expanded using an expanding jig, the expanding jig includes a small-diameter end having a diameter smaller than an inner diameter of the hollow cylindrical electric wire assembly, a large-diameter portion having a diameter substantially equal to the inner diameter of the stator core, and a taper portion that tapers from the large-diameter portion to the small-diameter end, in radially expanding the hollow cylindrical electric wire assembly, the expanding jig is inserted, from the small-diameter end, into the radially inside of the assembly, until the large-diameter portion comes to occupy the entire axial length of the assembly.

6. The method as set forth in claim 5, wherein the expanding jig further includes a plurality of rollers that are provided on the radially outer periphery of the large-diameter portion and configured to be rollable in an axial direction of the expanding jig.

7. The method as set forth in claim 6, wherein the rollers are provided at the boundary between the large-diameter portion and the taper portion, the number of the rollers is equal to the number of the slots of the stator core, and in the mounting step, the expanding jig is positioned in the circumferential direction of the stator core so that each of the rollers is radially aligned with a corresponding one of the slots of the stator core.

8. The method as set forth in claim 1, wherein L2 is substantially equal to $(D2 \times L1)/D1$, where D2 represents the outer diameter of the hollow cylindrical electric wire assembly before the mounting step, L2 represents the pitch between the straight portions in each of the shaped electric wires included in the hollow cylindrical electric wire assembly before the mounting step, D1 represents the outer diameter of the hollow cylindrical electric wire assembly after the mounting step, and L1 represents the pitch between the straight portions in each of the shaped electric wires include in the hollow cylindrical electric wire assembly after the mounting step.

* * * * *